(12) United States Patent
Yamamoto

(10) Patent No.: US 8,520,121 B2
(45) Date of Patent: Aug. 27, 2013

(54) DIGITAL CAMERA

(75) Inventor: Yasuhiro Yamamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 24 days.

(21) Appl. No.: 13/252,486

(22) Filed: Oct. 4, 2011

(65) Prior Publication Data

US 2012/0086823 A1    Apr. 12, 2012

(30) Foreign Application Priority Data

Oct. 7, 2010    (JP) .................................. 2010-227619

(51) Int. Cl.
*H04N 5/222*    (2006.01)
*H04N 5/228*    (2006.01)
*H04N 5/225*    (2006.01)

(52) U.S. Cl.
USPC .................. 348/333.13; 348/208.99; 348/372

(58) Field of Classification Search
USPC ................... 348/208.99, 333.13, 208.16, 372
See application file for complete search history.

(56) References Cited

U.S. PATENT DOCUMENTS

| 6,262,767 B1 * | 7/2001 | Wakui .................... 348/211.99 |
| 8,094,959 B2 * | 1/2012 | Rai .............................. 382/254 |
| 2005/0122416 A1 * | 6/2005 | Ryu et al. ................ 348/333.07 |
| 2008/0136990 A1 * | 6/2008 | Kimura .......................... 349/46 |

FOREIGN PATENT DOCUMENTS

| JP | 10-010615 A | 1/1998 |
| JP | 2000-261697 A | 9/2000 |

OTHER PUBLICATIONS

U.S. Appl. No. 13/252,508 to Yasuhiro Yamamoto, filed Oct. 4, 2011.
U.S. Appl. No. 13/252,520 to Yasuhiro Yamamoto, filed Oct. 4, 2011.

* cited by examiner

*Primary Examiner* — Aung S Moe
*Assistant Examiner* — Amy Hsu
(74) *Attorney, Agent, or Firm* — Greenblum & Bernstein P.L.C.

(57) ABSTRACT

A digital camera is provided that includes a camera body and a monitor device. The camera body includes an imaging module, an image stabilization module, a first connector half and a first wireless communication module. The monitor device is detachable from the camera body and includes a monitor, a second connector half complementary to the first connector half and a second wireless communication module complementary to the first wireless communication module. An operation of the image stabilization module is suspended when monitor device is detached from the camera body.

15 Claims, 3 Drawing Sheets

MONITOR DEVICE 12 | CAMERA BODY 11

DIGITAL CAMERA

BACKGROUND OF THE INVENTION

1. Field of the Invention

The present invention relates to a digital camera with a detachable monitor.

2. Description of the Related Art

In general, digital cameras are provided with a monitor that is used to display a captured image or a through-the-lens image (a live preview image). In certain such cameras, a monitor is configured to be rotatable with respect to the camera body via a rotating mechanism, such as a hinge. Further, a digital camera with a monitor being made detachable from the camera body is also provided in Japanese Unexamined Patent Publication No. 2000-261697.

SUMMARY OF THE INVENTION

On the other hand, recent digital cameras often include functions that consume large amounts of energy, such as a shake reduction system or an image stabilization system, etc. Of course it is preferable to suspend large energy consuming functions, such as the shake reduction system, when their use is not required.

Therefore, one aspect of the present invention is to provide effective power saving features to a monitor-detachable digital camera configured with an image stabilization system.

According to the present invention, a digital camera is provided that includes a camera body and a monitor device. The camera body includes an imaging module, an image stabilization module, a first connector half and a first wireless communication module. The monitor device is detachable from the camera body and includes a monitor, a second connector half complementary to the first connector half, and a second wireless communication module complementary to the first wireless communication module. An operation of the image stabilization module is suspended when the monitor device is detached from the camera body.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
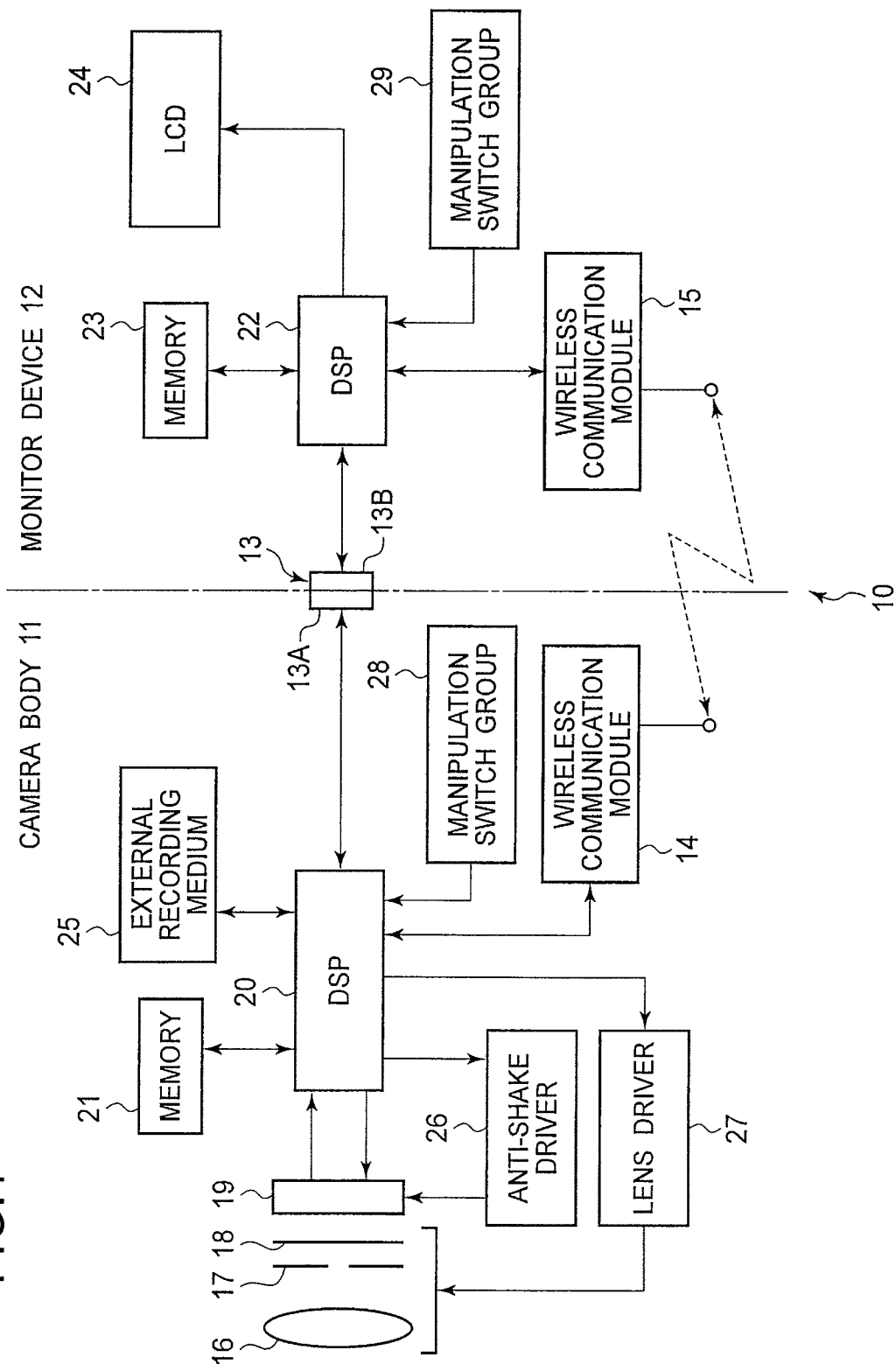
FIG. 1 is a block diagram schematically illustrating the general structure of a digital camera of an embodiment of the present invention.

The present invention is described below with reference to the embodiments shown in the drawings.

FIG. 1 is a block diagram schematically illustrating the general structure of a digital camera to which an embodiment of the present invention is applied.

The digital camera 10 includes a camera body 11 and a monitor device 12. The monitor device is configured to be detachable from the camera body 11. When the monitor device 12 is attached to the camera body 11, the camera body 11 and the monitor device 12 are electrically connected to each other via a connector 13, which is composed of a pair of connector halves 13A and 13B. Namely, image data (i.e., data of a through-the-lens image or still image) and control signals are transmitted/received between the camera body 11 and the monitor device 12 via the connector 13. On the other hand, when the monitor device 12 is detached from the camera body 11, the above-mentioned data and signals are transmitted/received through wireless communications by wireless communication modules 14 and 15 provided on each side of the camera body 11 and monitor device 12. Note that the wireless communications may include wireless light communications or the like, while wireless radio communications may be preferable.

In the camera body 11, an image sensor 19 captures an object image through a lens system 16, an aperture 17 and a shutter 18. The image captured by the image sensor 19 is fed to a digital signal processor (DSP) 20 where predetermined image processing is performed. Further, the image data is temporarily stored in memory 21 and also fed to a digital signal processor (DSP) 22 of the monitor device via the connector 13 or the wireless communication modules 14 and 15. The image data received by the digital signal processor (DSP) 22 is stored in memory 23 of the monitor device 12. At the same time, the received image may also be displayed on an LCD or monitor 24 of the monitor device 12. Note that the image stored in the memory 21 can also be recorded onto an external recording medium 25, such as a memory card or the like, if desired.

Further, the camera body 11 of the present embodiment is configured with an anti-shake mechanism, which is driven by an anti-shake driver 26, to provide shake reduction or image stabilization functionality. In the example of FIG. 1, a sensor-shift type is chosen as the anti-shake mechanism, however, a lens-based type or any other type of image stabilization system or module may also be applied.

In the present embodiment, the optical system including the lens system 16, aperture 17, shutter 18 and so on, is controlled by a lens driver 27. Further, the anti-shake driver 26 and the lens driver 27 are controlled by the digital signal processor 20. Manipulation switch groups 28 and 29 provided on each of the camera body 11 and the monitor device 12 are connected to the digital signal processors (DSPs) 20 and 22, respectively. Each of the digital signal processors (DSPs) 20 and 22 performs various types of processes based on the manipulation of switches in the manipulation switch groups 28 and 29. Note that instead of or in addition to the manipulation switch group 29, a touchscreen may be applied to the LCD 24.

Figure 2:
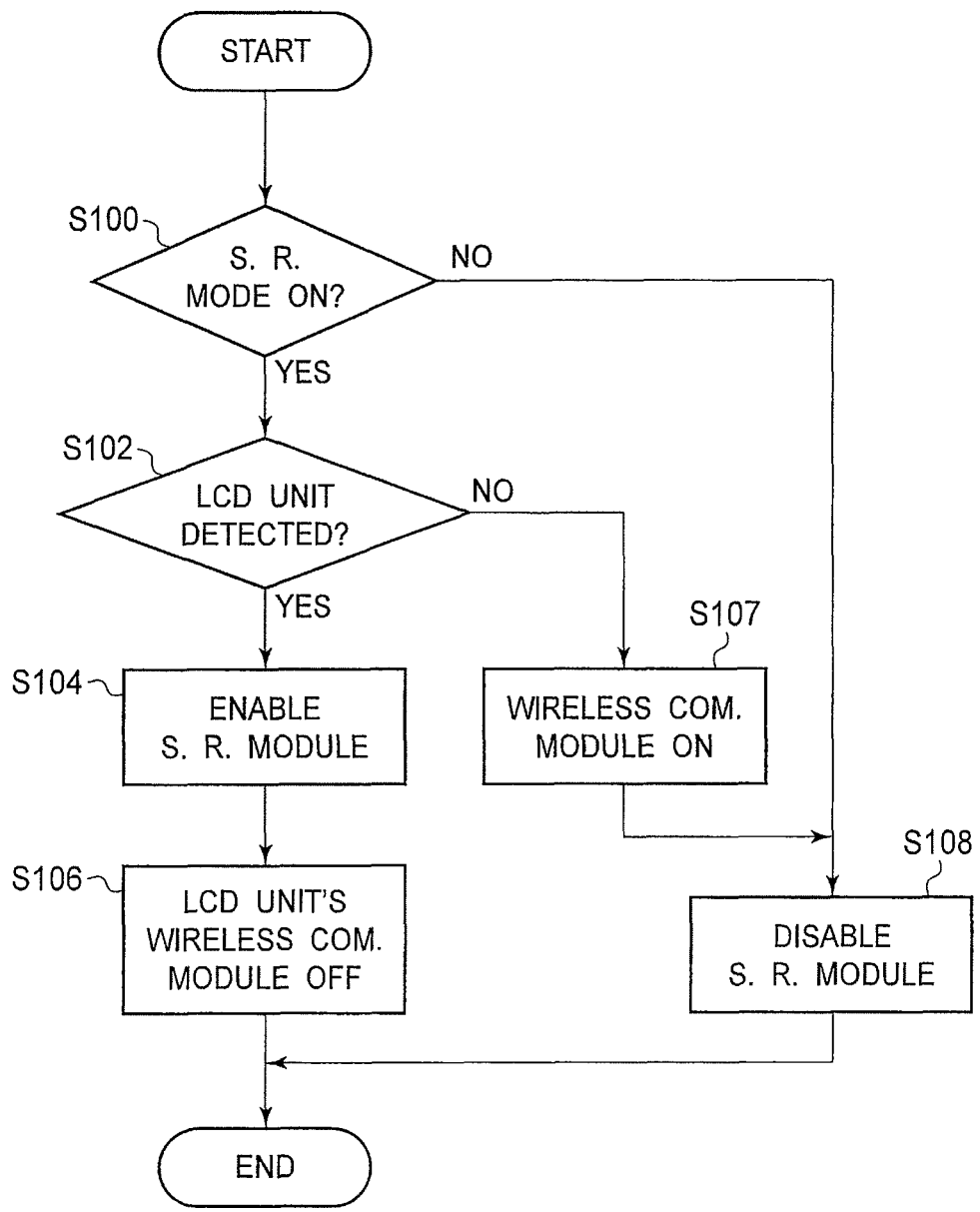
FIG. 2 is a flowchart of a power-saving operation.

With reference to FIG. 2, a power-saving operation carried out by the digital camera 10 of the present embodiment will be explained.

While the monitor device 12 is detached from the camera body 11, the digital camera 10 of the present embodiment is very likely fixed to a tripod or positioned on a table or other flat service. Therefore, in such a situation the shake-reduction or image-stabilization function or module may preferably be automatically suspended or turned off to save electrical power.

On the other hand, when the monitor device 12 is attached to the camera body 11, it may be preferable to suspend or turn off either or both of the wireless communication modules 14 and 15 to conserve electric power since wireless communications are normally not required in either the camera body 11 or monitor device 12 in such situations. However, the wireless communication module 14 of the camera body 11 may carry out wireless communications with a device other than the monitor device 12, therefore in the present embodiment only the wireless communication module 15 of the monitor device 12 is automatically turned off when the monitor device 12 is attached to the camera body 11. Note that in the present embodiment, the wireless communication module 14 of the camera body 11 in this situation can be either turned on or off in accordance with a user's selection.

The power saving operation described in FIG. 2 is repeatedly carried out by the digital signal processor 20 of the camera body 11 at a predetermined time interval. In Step S100, whether or not the shake reduction or image stabilization function mode is preset to the ON-state is determined. Note that the shake reduction function mode can be optionally set by a user by manipulating an operational member (not shown), such that the shake reduction function mode can be set to either of the ON-state or the OFF-state. When it is determined that the shake reduction function mode is set to the OFF-state, the status of the shake reduction function is altered from the ON-state to the OFF-state or maintained in the OFF-state if the OFF-state has already been selected, thereby disabling the shake reduction function. Namely, the electric power supply to the anti-shake driver 26 or the shake reduction module is suspended and the power-saving operation processes terminate.

On the other hand, when it is determined in Step S100 that the shake reduction or image stabilization function mode is set to the ON-state, whether or not the monitor device (LCD unit) 12 is attached to the camera body 11 is determined in Step S102. The method for detecting the attachment of the monitor device 12 to the camera body 11 will be detailed later with reference to FIG. 3. When attachment of the monitor device 12 has not been detected in Step S102, wireless data transmission via the wireless communication modules 14 and 15 is activated in Step S107 and the shake reduction function is disabled in Step S108, as described above, such that the electric power supplied to the anti-shake driver or the shake reduction module is suspended. Thus, the shake reduction operation controlled by the anti-shake driver is forcibly terminated along with the power saving operation. Note that any operations of manipulation switch group 28 of the camera body 11 may also be disabled at the same time while enabling operations of the manipulation switch group 29 of the monitor device 12, which has been detached from the camera body 11. For example, when the attachment of the monitor device 12 is not detected, a flag representing the prohibition of inputs from the manipulation switch group 28 to the digital signal processor (DSP) 20 may be raised in the DSP 20.

On the other hand, when it is determined in Step S102 that the monitor device 12 is attached to the camera body 11, either the ON-state of the shake-reduction or image-stabilization function is maintained or the status is altered from the OFF-state to the ON-state so that the shake-reduction or image-stabilization function is enabled in Step S104. Namely, the electric power supplied to the anti-shake driver 26 is either maintained or started. Further, the wireless communication module 15 of the monitor device (LCD unit) 12 is either altered from the ON-state to the OFF-state or maintained in the OFF-state, and in turn, this power saving operation terminates.

Figure 3:
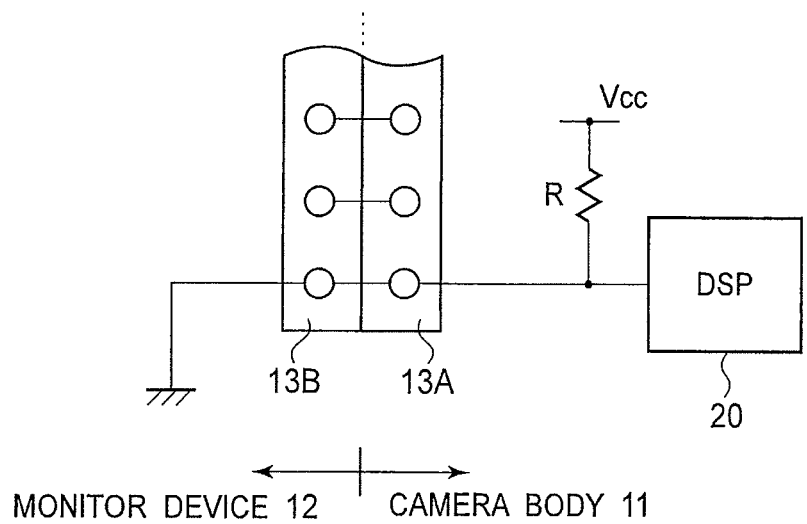
FIG. 3 is a connection diagram of connector terminals of the present embodiment.

With reference to FIG. 3, structures for detecting the attachment of the monitor device 12 in the present embodiment will be explained. In the present embodiment, the attachment of the monitor device 12 is detected through the terminal connection in the connector 13.

FIG. 3 schematically shows the connection of terminals in the connector 13, which is used for detection of the attachment status of the monitor device 12. Although there are a number of terminals provided in the connector 13, only three of them are described in FIG. 3 in this example. In FIG. 3, the connector half 13B of the monitor device 12 is connected to the connector half 13A of the camera body 11.

A terminal of the connector half 13B that is used to detect the attachment of the monitor device 12 to the camera body 11 is connected to the ground while the voltage of the complementary terminal of the connector half 13A of the camera body 11 is pulled up via a pull-up resistor R connected to a terminal of the digital signal processor (DSP) 20 that is assigned to the above detection. Namely, when the monitor device 12 is detached from the camera body 11 and the connector halves 13A and 13B are disconnected, the voltage of the detection terminal of the digital signal processor (DSP) 20 is kept high. On the other hand, when the monitor device 12 is attached to the camera body 11 and the connector halves 13A and 13B are connected, the detection terminal of the digital signal processor (DSP) 20 is connected to the ground and the voltage level of the detection terminal is changed to low. Namely, the digital signal processor (DSP) 20 determines the attachment status of the monitor device 12 by determining whether the voltage of the detection terminal is high or low.

As described above, according to the present embodiment, the electrical power consumption of a monitor-detachable digital camera provided with a shake reduction system or an image stabilization system is reduced by suspending the shake reduction operation when the monitor device is detached form the camera body. And by suspending the power supply to a wireless communication module when the monitor device is attached to the camera body, electrical power consumption is further reduced.

Note that the digital camera in this embodiment may include either a digital still camera or a digital video camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-227619 (filed on Oct. 7, 2010), which is expressly incorporated herein, by reference, in its entirety.

The invention claimed is:

1. A digital camera, comprising:
    a camera body that includes an imaging module, an image stabilization module, a first connector half and a first wireless communication module;
    a monitor device that is detachable from said camera body and that includes a monitor, a second connector half complemental to said first connector half and a second wireless communication module complemental to said first wireless communication module; and
    an operation of said image stabilization module being automatically suspended such that said image stabilization module is placed in a power-saving state when said monitor device is detached from said camera body.

2. The digital camera as in claim 1, wherein electronic power supplied to said second wireless communication module is suspended when said monitor device is attached to said camera body.

3. The digital camera as in claim 2, wherein attachment status of said monitor device to said camera body is determined by detection of an electrical connection between said first and second connector halves.

4. The digital camera as in claim 3, wherein operations of manipulation switches on said camera body are made void when said monitor device is detached from said camera body.

5. The digital camera as in claim 1, wherein the suspension of the operation of said image stabilization module when said monitor device is detached from said camera body is performed by the suspension of electric power supplied to said image stabilization module.

6. A digital camera, comprising:
a camera body that includes an imaging module, an image stabilization module, a first connector half and a first wireless communication module, and said image stabilization module being set to one of an on-state and an off-state;
a monitor device that is detachable from said camera body and that includes a monitor, a second connector half complemental to said first connector half and a second wireless communication module complemental to said first wireless communication module; and
an operation of said image stabilization module being automatically suspended such that said image stabilization module is placed in a power-saving state, irrespective of the set on-state and the set off-state of said image stabilization module, when said monitor device is detached from said camera body.

7. The digital camera as in claim 6, wherein electronic power supplied to said second wireless communication module is suspended when said monitor device is attached to said camera body.

8. The digital camera as in claim 7, wherein attachment status of said monitor device to said camera body is determined by detection of an electrical connection between said first and second connector halves.

9. The digital camera as in claim 8, wherein operations of manipulation switches on said camera body are made void when said monitor device is detached from said camera body.

10. The digital camera as in claim 6, wherein the suspension of the operation of said image stabilization module when said monitor device is detached from said camera body is performed by the suspension of electric power supplied to said image stabilization module.

11. A digital camera, comprising:
a camera body that includes an imaging module, an image stabilization module, a first connector half and a first wireless communication module,
a monitor device that is detachable from said camera body and that includes a monitor, a second connector half complemental to said first connector half and a second wireless communication module complemental to said first wireless communication module; and
an operation of said image stabilization module being automatically suspended such that said image stabilization module is placed in a power-saving state when said monitor device is detached from said camera body and an operation of said second wireless communication module being automatically suspended when said monitor device is attached to said camera body,
wherein the operation of said image stabilization mode is enabled when the operation of said second wireless communication module is suspended and the operation of said image stabilization mode is suspended when the operation of said second wireless communication module is enabled.

12. The digital camera as in claim 11, wherein electronic power supplied to said second wireless communication module is suspended when said monitor device is attached to said camera body.

13. The digital camera as in claim 12, wherein attachment status of said monitor device to said camera body is determined by detection of an electrical connection between said first and second connector halves.

14. The digital camera as in claim 13, wherein operations of manipulation switches on said camera body are made void when said monitor device is detached from said camera body.

15. The digital camera as in claim 11, wherein the suspension of the operation of said image stabilization module when said monitor device is detached from said camera body is performed by the suspension of electric power supplied to said image stabilization module.

* * * * *